Dec. 23, 1930.          H. D. GEYER          1,785,897
ONE-PIECE RIM AND SPIDER STEERING WHEEL
Filed April 30, 1928
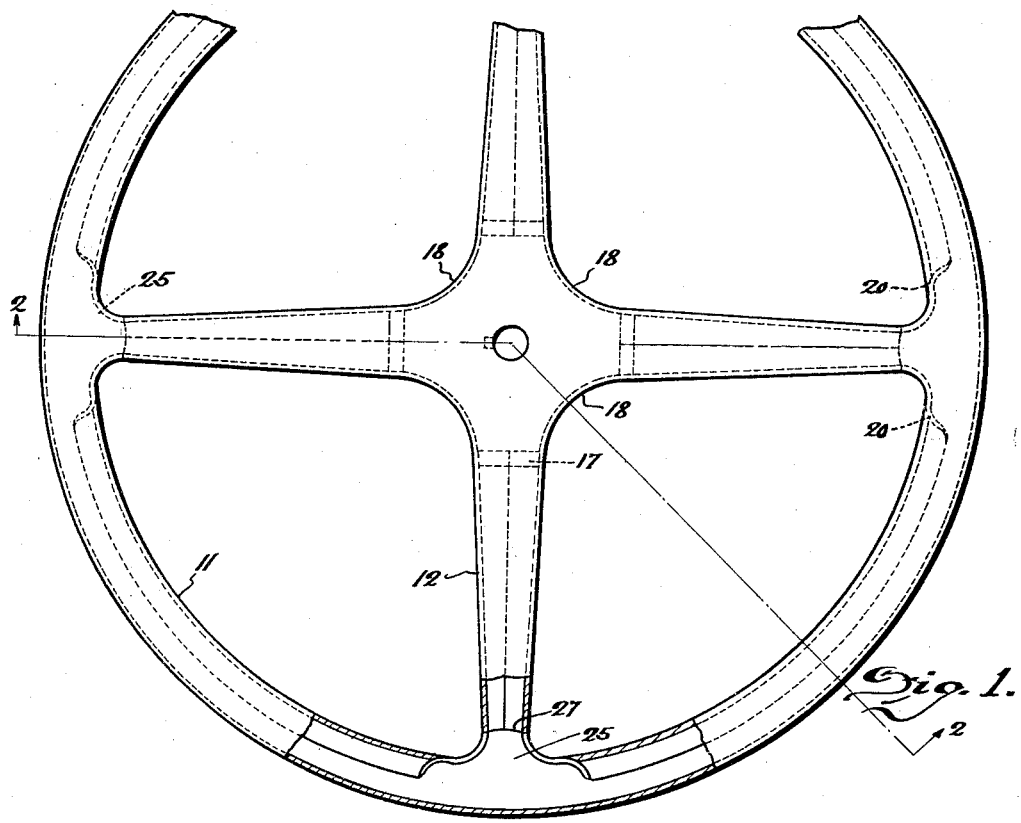
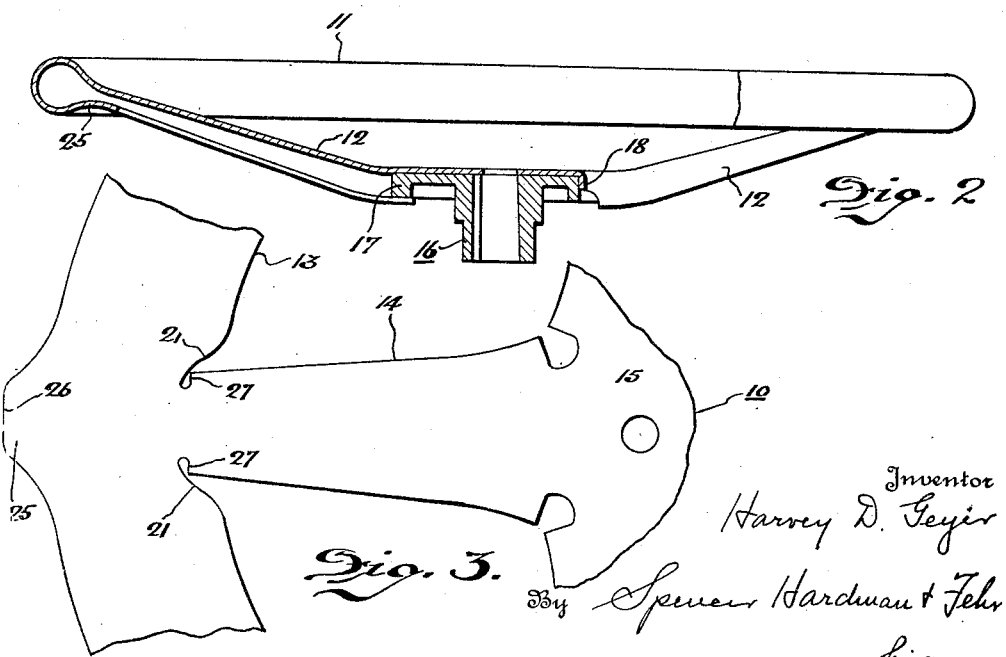

Patented Dec. 23, 1930

1,785,897

UNITED STATES PATENT OFFICE

HARVEY D. GEYER, OF DAYTON, OHIO, ASSIGNOR TO THE INLAND MANUFACTURING COMPANY, OF DAYTON, OHIO, A CORPORATION OF DELAWARE

ONE-PIECE RIM AND SPIDER STEERING WHEEL

Application filed April 30, 1928. Serial No. 274,051.

This invention relates to handwheels, especially such as are adapted for use as steering wheels on automotive vehicles.

An object of this invention is to provide an improved form of handwheel having the closed section rim and closed section spokes stamped from a single piece of sheet metal. Heretofore such one-piece spiders have been devised, but usually there has been an opening left at the under-side of the outer end of the closed section spoke where it adjoins the rim, while often there is a very weak connection between the spoke and the rim, both of these defects being due to the difficulty of providing sufficient metal from the flat metal blank to properly form the tubular or substantially tubular rim and the closed section spoke at the junction point of the rim and spoke. Features of this present invention are the entire absence of any unclosed opening at the junction of the closed section rim and spokes and the high strength of the connection between said rim and spokes. Thus this invention provides a well-shaped and strong one-piece pressed metal rim and spokes which has a smooth and uninterrupted gripping surface for the hands of the operator. It is therefore unnecessary for the rim or spokes to be covered or encased with celluloid or any other molded composition such as has been used heretofore, and the entire wheel being of metal it may be finished with a baked-on enamel to give a lasting finish.

Further objects and advantages of the present invention will be apparent from the following description, reference being had to the accompanying drawings, wherein a preferred embodiment of one form of the present invention is clearly shown.

In the drawings:

Fig. 1 is a plan view of an automobile steering wheel built according to this invention, a portion of the rim being shown cut away to more clearly illustrate the projecting tongue on the under side of the rim which lies flush with and abuts the bottom wall of the box section spoke.

Fig. 2 is a section on line 2—2 of Fig. 1.

Fig. 3 is a view showing the shape of the flat sheet metal blank (a typical portion only being shown) from which the one-piece rim and spider are formed.

Similar reference characters refer to similar parts throughout the drawings.

In the drawings, 10 designates the flat sheet metal blank (see Fig. 3) from which the round or oval section rim 11 and box section spokes 12 are formed. The annular portion 13 of the blank (only a small part of which is shown in Fig. 3) is of sufficient width to be bent up into the desired rim section, while the four radial portions 14 of the blank are of sufficient width to be bent up and form the slightly tapered box section spokes 12 which at their inner ends are bent around and snugly enclose the radial projections 17 of the central hub casting 16. The central portion 15 of the flat blank overlies the top surface of the hub casting 16 and has a marginal portion bent and drawn down to form a small flange 18 to partially cover the side concave surfaces extending between adjacent hub projections 17, as clearly shown in Figs. 1 and 2. The hub casting and spider portion of this wheel is made substantially according to Patent #1,638,044 issued to J. W. Lee on August 9, 1927, and therefore need not be further described herein.

In the present invention the spoke blanks 14 extend, as it were, up into a recess in the rim blank 13 (see Fig. 3), in other words the inner margin of the rim blank 13 overlaps to a considerable distance the outer ends of the spoke blanks 14. This form of the blank permits a closed rim section to be bent up from the rim blank 13, but leaves an opening 20 on the under side of the rim section adjacent the spoke end due to the cut away portions 21 (see Fig. 3). Now in order to provide metal for closing this opening 20, the rim blank 13 is cut out with an outwardly projecting tongue 25, so shaped that when the rim blank is bent into the tubular rim form this tongue 25 can be bent down around the under side of the rim and accurately fill this opening 20 and have its end surface 26 abut the end surface 27 of the bottom wall of the spoke section. Fig. 3 shows substantially the curved shape of tongue 25 which can be bent to accurately fill and lie flush with the periphery of opening 20 to form a completely closed smooth even construction at the junction of the rim and spoke. Preferably the end 26 of the tongue 25 is welded to the end surface 27 of the bottom wall of the spoke which very greatly increases the bending strength of the spokes to resist an upward pull on the wheel rim.

A steering wheel made in this manner presents to the hands of the driver no rough edges or recesses on the under side of the rim or spokes. Since it is made entirely of metal it can be finished all over with a baked enamel finish after being completed, whereas wheels with wood or molded rims and metal spiders can have their spiders finished with baked enamel only prior to their assembly upon the rim.

While the form of embodiment of the present invention as herein disclosed, constitutes a preferred form, it is to be understood that other forms might be adopted, all coming within the scope of the claims which follow.

What is claimed is as follows:

1. A steering wheel having the rim and spokes thereof stamped from a single piece of sheet metal, comprising: a complete tubular rim bent up from flat sheet metal and having a butt joint therein extending around its under side, integral box section spokes radiating from said rim and having a butt joint extending along their under sides, the under side of said rim having a projecting tongue portion where each spoke adjoins said rim which tongues are bent radially inward to close the open outer end of said box section spokes.

2. A steering wheel having the rim and spokes thereof stamped from a single piece of sheet metal, comprising: a spider portion having closed section spokes bent up from flat metal, a tubular rim portion bent up from flat metal to form a closed section and having inwardly projecting tongues on the under side thereof at the junction of the spokes therewith, which tongues close the otherwise open outer ends of said spokes.

3. A steering wheel having the rim and spokes thereof stamped from a single piece of sheet metal, comprising: a spider portion having closed section spokes bent up from flat metal, a tubular rim portion bent up from flat metal to form a closed section and having inwardly projecting tongues on the under side thereof at the junction of the spokes therewith, which tongues close the otherwise open outer ends of said spokes, said tongues having a welded joint with the under wall of said spokes.

4. A steering wheel having the rim and spokes thereof stamped from a single piece of sheet metal, comprising: a spider portion having closed section spokes bent up from flat metal, and a rim portion bent up from flat metal to form a closed section, said rim portion having inwardly projecting tongues at the junction of the spokes therewith, said tongues closing the otherwise open outer ends of said spokes.

In testimony whereof I hereto affix my signature.

HARVEY D. GEYER.